US007962656B1

(12) United States Patent
Ang et al.

(10) Patent No.: US 7,962,656 B1
(45) Date of Patent: Jun. 14, 2011

(54) COMMAND ENCODING OF DATA TO ENABLE HIGH-LEVEL FUNCTIONS IN COMPUTER NETWORKS

(75) Inventors: Boon Seong Ang, Sunnyvale, CA (US); Michael Steven Schlansker, Los Altos, CA (US); Robert Samuel Schreiber, Palo Alto, CA (US); Jean-Francois Collard, Sunnyvale, CA (US); Norman Paul Jouppi, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1526 days.

(21) Appl. No.: 11/324,518

(22) Filed: Jan. 3, 2006

(51) Int. Cl.
*G06F 15/16* (2006.01)
(52) U.S. Cl. ...................................................... 709/250
(58) Field of Classification Search .................. 370/463; 709/220, 250
See application file for complete search history.

(56) References Cited

U.S. PATENT DOCUMENTS

| | | | |
|---|---|---|---|
| 6,370,599 B1 * | 4/2002 | Anand et al. | 710/15 |
| 6,993,644 B2 * | 1/2006 | Anand et al. | 713/1 |
| 7,411,973 B2 * | 8/2008 | McDaniel et al. | 370/463 |
| 7,426,189 B2 * | 9/2008 | McGee et al. | 370/254 |
| 7,461,160 B2 * | 12/2008 | Boucher et al. | 709/230 |
| 2003/0058274 A1 * | 3/2003 | Hill et al. | 345/751 |
| 2004/0240435 A1 * | 12/2004 | Boucher et al. | 370/352 |
| 2005/0144223 A1 * | 6/2005 | Yang et al. | 709/203 |
| 2005/0160139 A1 * | 7/2005 | Boucher et al. | 709/203 |
| 2005/0278459 A1 * | 12/2005 | Boucher et al. | 709/250 |
| 2006/0173970 A1 * | 8/2006 | Pope et al. | 709/216 |
| 2006/0282838 A1 * | 12/2006 | Gupta et al. | 719/313 |

* cited by examiner

*Primary Examiner* — Nathan Flynn
*Assistant Examiner* — Najeeb Ansari

(57) ABSTRACT

Methods and systems for communicating between network interface controllers (NICs) in networked systems are described. Enhanced command functionality for NICs include the ability to perform sequences of operations and/or conditional operations. Messages can be used to communicate embedded commands which are interpreted by NICs to enhance their functionality.

21 Claims, 4 Drawing Sheets

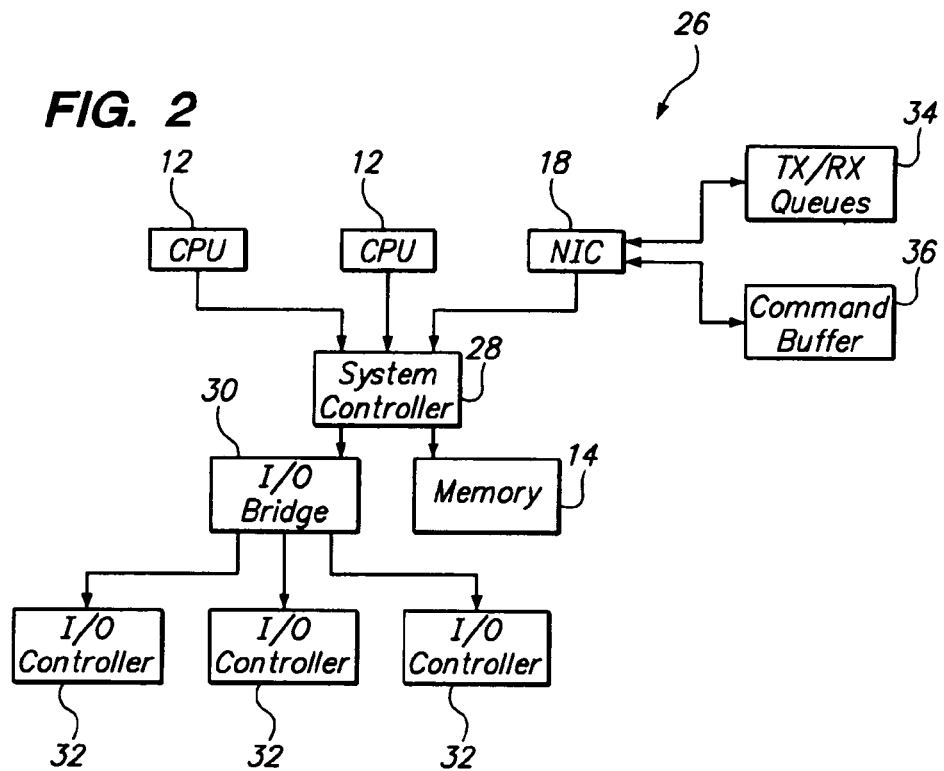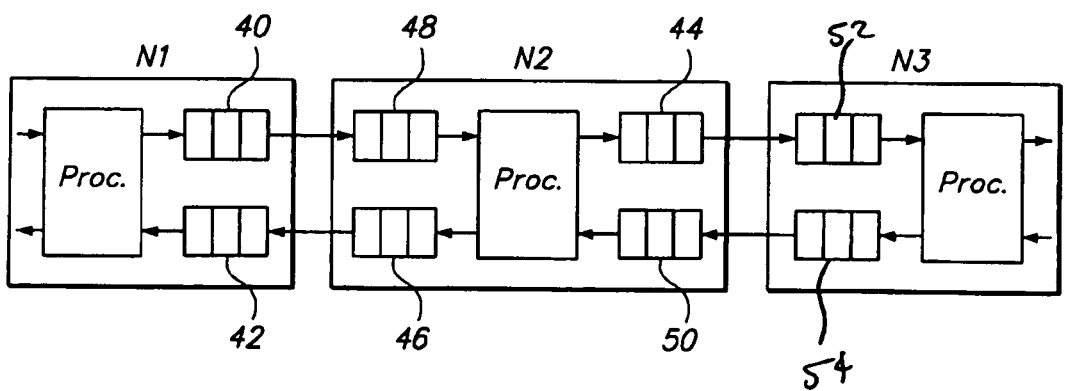

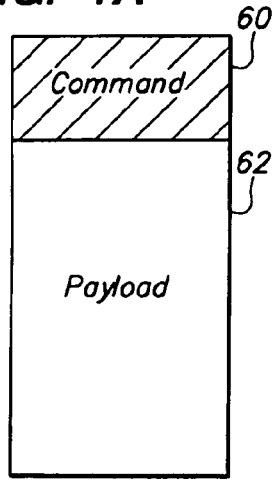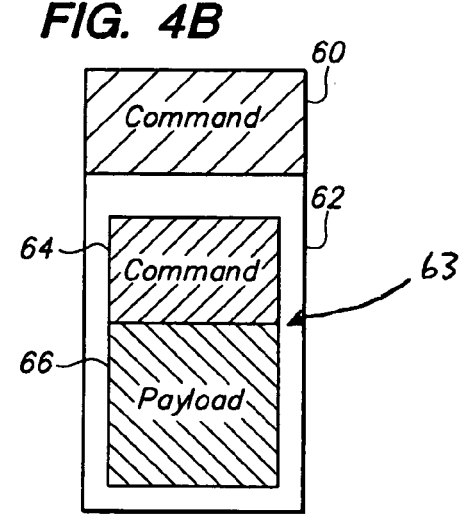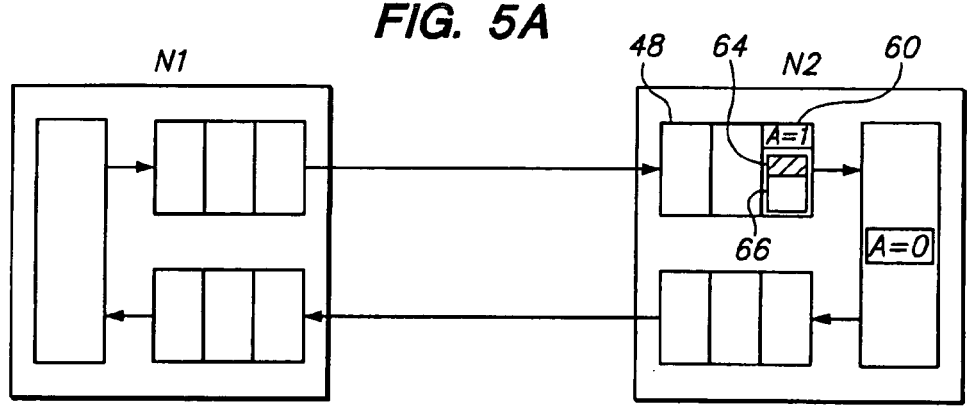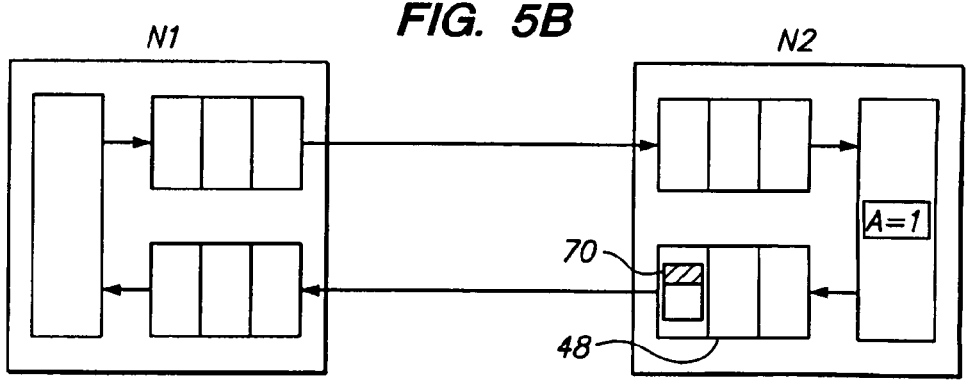

COMMAND ENCODING OF DATA TO ENABLE HIGH-LEVEL FUNCTIONS IN COMPUTER NETWORKS

BACKGROUND

The present invention relates generally to data communication systems and methods and, more particularly, to data communication systems and methods in which commands are encoded in a manner that facilitates high-level functionality.

Ethernet's broad use continues to stimulate dramatic increases in performance and decreases in cost for components commonly used in commercial applications. Many of today's commercial applications tolerate the relatively high latency associated with Ethernet-based systems, however emerging commercial applications, such as multithreaded databases and file systems, will likely require reduced latency. Some specialized network solutions provide reduced latency, but are more expensive than Ethernet-based scalable clusters.

One area in which latency performance can be improved is in the network interface controller (NIC). A NIC is a hardware device that supports communication with a network. As context, consider the exemplary system of FIG. 1. Therein a symmetric multiprocessor (SMP) system 10 includes a number of central processor units (CPUs) 12 which share memory unit 14 via coherence fabric 16. Although SMP 10 is shown as having four processor cores, those skilled in the art will appreciate that SMP 10 can have more or fewer CPUs. SMP 10 sends messages to other SMPs 20 under the control of NIC 18 via Ethernet connections and a fabric (switch) 22. The NIC 18 will typically have a processor (not shown) associated therewith, either as an integral part of the NIC or in the form of a helper processor, so that the NIC has sufficient intelligence to interpret various commands. The fabric 22 will route messages to their intended recipients, although occasionally messages will be dropped such that the system illustrated in FIG. 1 supports retransmission of dropped messages. Although there may only be one hardware NIC 18 per SMP 10, 20, many different software programs may be running simultaneously on a given SMP and may have messages to transmit across the system via fabric 22. Note that the above described system is purely exemplary and that the present invention is equally applicable to, among other things, systems involving single processor systems.

Given the large number of messages that may be communicated between NICs, message handling can introduce significant latency in systems such as that illustrated in FIG. 1. Accordingly, it would be desirable to provide mechanisms and methods which reduce latency in such networked systems.

SUMMARY

According to one exemplary embodiment of the present invention, a method for communicating commands between network interface controllers (NICs) includes the steps of: providing at least one first host, providing at least one second host computer, providing a first NIC as an interface between the at least one first host computer and the at least one second host computer, providing a second NIC as an interface between the at least one second host computer and the at least one first host computer, transmitting a message from the first NIC to the second NIC, the message including a command portion and a payload portion, interpreting, by the second NIC, the command portion of the message as a command for the second NIC to perform at least one of: a sequence of operations and a conditional operation, and performing, by the second NIC, the at least one of said sequence of operations and the conditional operation.

According to another exemplary embodiment of the present invention, a network system includes at least one first host computer, at least one second host computer, a first network interface controller (NIC) operating as an interface between the at least one first host computer and at least one second host computer, and a second NIC operating as an interface between the at least one second host computer and the at least one first host computer, wherein a message is transmitted from the first NIC to the second NIC, the message including a command portion and a payload portion, wherein the second NIC interprets the command portion of the message as a command for the second NIC to perform at least one of: a sequence of operations and a conditional operation and wherein the second NIC performs the at least one of the sequence of operations and the conditional operation.

BRIEF DESCRIPTION OF THE DRAWINGS

The accompanying drawings, which are incorporated in and constitute a part of the specification, illustrate an embodiment of the invention and, together with the description, explain the invention. In the drawings:

FIG. 2 depicts an exemplary architectural association between a host computer and a NIC according to an exemplary embodiment of the present invention;

FIG. 3 shows three NICs communicating with one another via transmit and receive queues according to an exemplary embodiment of the present invention;

FIGS. 4(a) and 4(b) depict a message format without an embedded message and a message format including an embedded message according to an exemplary embodiment of the present invention, respectively;

FIGS. 5(a) and 5(b) illustrate an operation on an embedded message in a NIC according to an exemplary embodiment of the present invention;

DETAILED DESCRIPTION

The following description of the exemplary embodiments of the present invention refers to the accompanying drawings. The same reference numbers in different drawings identify the same or similar elements. The following detailed description does not limit the invention. Instead, the scope of the invention is defined by the appended claims.

Figure 1:
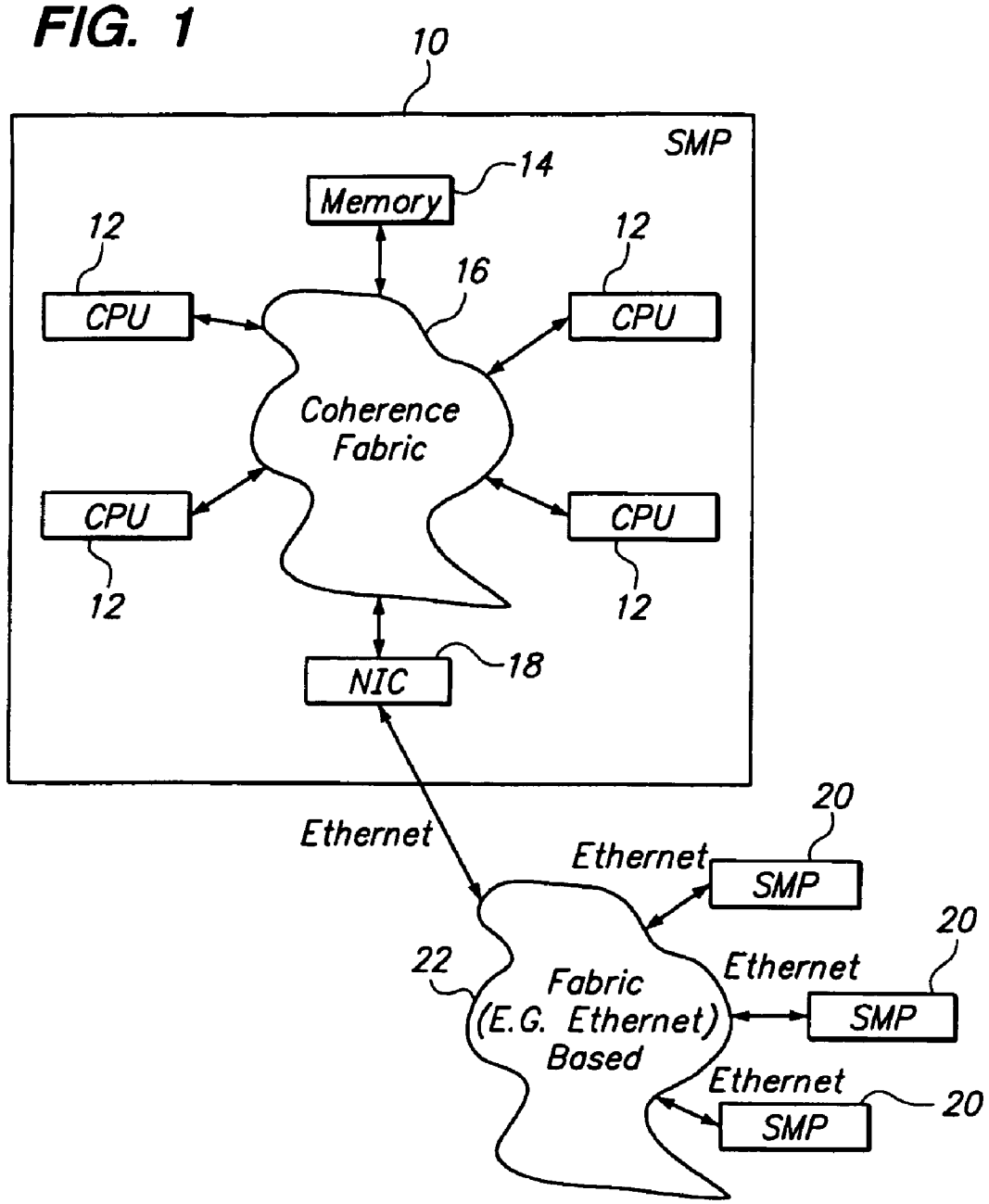
FIG. 1 illustrates an exemplary network system in which exemplary embodiments of the present invention can be implemented.

Reference is made again to the exemplary system described above with respect to FIG. 1. Exemplary embodiments of the present invention include network interface cards 18 (NICs) attached to computers and communicating via messages. NICs have access to the memory 14 of the computer (e.g., SMP) they are attached to, and messages exchanged by NICs 18 can be stored in incoming and outgoing queues. As mentioned above, the NICs may include a processor, programmable or not, to perform the tasks described herein, preferably without interrupting the processor(s) 12 of the attached computer. To distinguish between the NIC's own processor (whether that processor is physically part of the NIC or not) and the host computer's CPU(s), the former are referred to herein as a NIC's "local processor".

The host computer associated with a NIC 18 may have a variety of different architectures. In an exemplary configuration illustrated in FIG. 2, the NIC 18 is connected to the CPU side of a system controller chipset 28. This allows the NIC 18 to act like a processor in accessing memory 14, without requiring intervention by a processor 12 on behalf of the NIC 18. Furthermore, in contrast to other I/O devices (not shown) which can use direct memory access via an I/O controller 32 and I/O bridge 30, the NIC 18 is typically positioned to operate with lower latency, preferably directly in application program address spaces without requiring action by the operating system. Each NIC 18 will also typically have various transmit and receive queues 34 and a command buffer 36 as will be described in more detail below.

Regardless of the specific host computer or network architecture, to further reduce latency, enable high bandwidth communication, and reduce overhead on host processors, exemplary embodiments of the present invention enable messages transmitted between NICs 18 to contain embedded commands. These embedded commands can be operated on by the receiving NIC without requiring intervention by that NIC's host computer's CPU(s). This command indirection capability according to exemplary embodiments of the present invention can be utilized to provide many functions in such networks. For example, by requesting that a data value be read on a remote computer and transmitted back to the computer originating a request and deposited in its memory, a remote "load" or "get" function can be implemented. Similarly, data can be "stored" or "put" on a remote computer from a local computer. In addition, since multiple messages and commands can be contained in an incoming message, this enables fan-out of messages or mass synchronization to be performed, all without requiring overhead processing by host computer CPU(s).

For illustrative purposes, consider a simplified portion of a networked system as shown in FIG. 3, wherein N2 interacts with NICs N1 and N3. Therein, each NIC has a processor (Proc.) that operates as described below and there are two queues between any two NICs, one in each direction. Thus, NIC N1 transmits messages to NIC N2 using queue 40 and receives messages from NIC N2 via queue 42. Similarly, NIC N2 has transmit queues 44 and 46 and receive queues 48 and 50, while NIC N3 receives messages from NIC N2 via queue 52 and transmits messages to NIC N2 via queue 54. NICs N1 and N3 also have another pair of queues (not shown) enabling them to interface with other NICs (not shown).

Each message (also sometimes referred to as a packet in this description) is a combination of a command (header) 60 portion and a payload (data) portion 62. The payload portion 62 may contain only data, as is conceptually illustrated in the message format of FIG. 4(*a*). According to other exemplary embodiments of the present invention, e.g., as conceptually shown in FIG. 4(*b*), the payload portion 62 can be, or can contain, at least one embedded message 63. The embedded message 63 includes its own command portion 64 and payload portion 66.

In order to operate on embedded messages transmitted between NICs, NIC capabilities are enhanced according to exemplary embodiments of the present invention. For example, the library of commands which are understandable by NICs 18 (and their corresponding, local processors) can include at least one command which informs the NICs 18 that the payload portion 62 (or a subset thereof) of a received message shall be copied verbatim into a specified queue, e.g., a transmit queue of the recipient NIC. This copy operation is preferably performed by the NIC's hardware, or by software executed by the NIC's local processor, without intervention from the processor(s) of the attached computer. The time at which the copy is performed by the NIC 18 may vary. For example, the embedded message 63 can be copied after execution of the command 60 is completed.

To illustrate one way in which embedded message functionality according to exemplary embodiments of the present invention can be utilized, consider the example illustrated in FIGS. 5(*a*) and 5(*b*). Therein, a message from NIC N1 to NIC N2 may include a command 60 for storing a value in NIC N2's memory and a payload 62 containing an embedded message having a command portion 64 and a payload portion 66 addressed to NIC N1. At the time illustrated in FIG. 5(*a*), this message is next in NIC N2's inbound queue 48, waiting to be processed. At that point in time, a memory location in NIC N2 called A in FIG. 5(*a*) contains the value 0. NIC N2 processes the incoming message and executes the message's command 60. In this example, the command specifies that NIC N2 shall set memory location A to have a value of 1 and then to copy the payload as a message in transmit queue 46 to be sent to NIC N1. The state of the system after the message has been processed is shown in FIG. 5(*b*), where the newly created message is now next-to-be-processed in NIC N2's outbound queue 48. This example illustrates using embedded commands that are copied to a queue as a technique for acknowledging that the container command was performed successfully.

Figure 6:
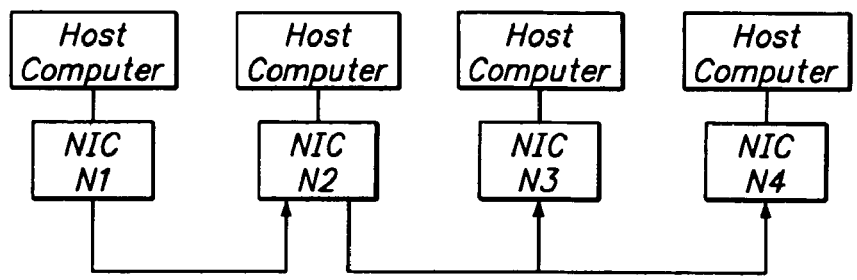
FIG. 6 illustrates message forwarding between NICs according to an exemplary embodiment of the present invention.

To further generalize the exemplary ways in which embedded commands can be used to reduce latency in network interfaces, without increasing processing overhead in their associated host processor(s), consider that the payload 62 of the message can contain several embedded messages and the command 60 of the message can specify different queues into which the payload's embedded messages should be copied. This functionality enables software to efficiently implement broadcasting of a message. For example, suppose that NIC N2 is connected to NICs N3 and N4 in addition to NIC N1 as illustrated in FIG. 6, and that NIC N1 wants to send a message to both NICs N3 and N4. Without using embedded messaging according to exemplary embodiments of the present invention, two transactions are needed between NICs N1 and N2—one transaction associated with the message that NIC N2 will forward to NIC N3 and the other transaction for the message that NIC N2 will forward to NIC N4. By way of contrast, according to exemplary embodiments of the present invention, a single message from NIC N1 to NIC N2 can carry all of the information that NIC N2 needs to forward NIC N1's message to both NIC N3 and NIC N4.

This technique, however, involves using as many embedded messages as there are final sendees. Thus, according to another exemplary embodiment of the present invention, the payload 62 of the container message includes a (single) message and several descriptors. The message contains all the needed information except for the identity of the sendees, and the descriptors specify the identities of the different sendees. The command 60 of the message specifies that the receiving NIC shall extract the embedded message from the payload 62 and then make as many copies as there are descriptors. Further, for each descriptor, the receiving NIC shall extract the identity of the sendee from the descriptor, copy that identify into the corresponding message copy, and place the message copy to the outbound queue corresponding to the sendee.

From the foregoing example, it will be further appreciated by those skilled in the art that NICs according to exemplary embodiments of the present invention will have enhanced interpretive capabilities in order to provide various advanced functionality made possible by embedded messages. Thus NICs, according to exemplary embodiments of the present invention will have one or more of the following capabilities listed in Table 1 below.

TABLE 1

| NIC Capability | Description |
| --- | --- |
| Sequence Capability | NICs having this capability will be able to interpret and execute operations which include operation type and optional operands. Messages can contain a sequence of operations that are received and executed in order by the NIC. |
| Finish Trigger Capability | The completion of a first operation in a sequence triggers the execution of a second operation in the sequence. |
| Execute Command Capability | The sequence of operations can be stored in a command buffer for interpretation and execution by the NIC. The NIC can receive a message containing an operation that specifies that some received data is to be inserted into the NIC's command buffer and then treated as a NIC operation. |
| Source Controlled Forwarding Capability | A specific type of execute command capability wherein when the payload is interpreted as an operation, that operation causes the transmission of some portion of that data field to yet another NIC. |
| Operand Assignment Capability | The capability for a NIC to assign an operand a value permitting efficient reuse of the value. |
| Sequence With Conditional Capability | A specific type of sequence capability wherein a first operation is executed by the NIC and returns a test value as an operand. |
| Iteration Capability | A command to execute a sequence of operations provided in a message multiple times. The number of iterations can be specified in the message or based on a dynamically determined test condition. |
| Table Based Forwarding Capability | A command which instructs a NIC to forward a message to one or more neighboring NICs. |

To illustrate how these capabilities work, separately or in combination, in accordance with exemplary embodiments of the present invention, consider the purely illustrative pseudo-code presented below. Pseudo-code example 1 provides an illustration of a NIC having sequence, finish trigger, execute command and source controlled forwarding capabilities. Comments illustrating the capability interaction are denoted by "/*" and "*/" delimiters.

Pseudo-Code Example 1
```
Send(target_node, msg_len
  {
  Put(dest_buffer_loc, offset, data_len, data);
  Finish( );
  Send(source_node, ack_len, Acknowledge(ackid, success_status));
  })
  )
/* a sequence of operations is executed */
/* Finish operation ensures that put is completed before acknowledge is sent */
/* a message is received that executes a Send command that causes a message containing an Acknowledge command to be sent to the originating node*/
/* source controlled forwarding is demonstrated as acknowledge is carried as data and then forwarded to source */
```

In pseudo-code example 2, below, an operand assignment capability of a NIC according to an exemplary embodiment of the present invention is illustrated.

Pseudo-code Example 2
```
Send(first_target_node, len1
{
  msg_string=Assign_string(data_len, msg_data);
  Put_string(buf_loc1, offset, data_len, msg_string);
  Send(target_node_2, len2, Put_string(buf_loc2, offset, data_len, String(msg_string)));
  Send(target_node_3, len3, Put_string(buf_loc3, offset, data_len, String(msg_string)));
}
```

In pseudo-code example 3, below, a NIC having sequence property capability is illustrated. The conditional execution capability in this example enables the NIC to execute a first operation and then either a second or third operation in the sequence of operations depending on the value of the test condition.

Pseudo-Code Example 3
```
Send(target_node, msg_len,
  {
  success=Append(dest_queue, data_len, data);
  if (success)
    then {noop;}
    else (Send(source_node, ack_len, Acknowledge(ackid, failed_status));}
  };
```

In pseudo-code example 4, below, a NIC having iteration capabilities is illustrated. Therein, a NIC executes a sequence of operations sent in a message multiple times. In this example, the number of repetitions to be performed by the NIC is specified in the received message.

Pseudo-Code Example 4
```
Send(target_node, encl_msg_len,
  {
  data_string=Assign_string(data_len, data);
  source_offset=Assign_value(0);
  dest_offset=Assign_value(0);
  len=Assign_value(8);
  for(trips=Assign_value(0),   trips=Add_value(trips,1), Less_than(trips, 4))
    {
    Put(dest_buffer_name, dest_offset, len, Extract_string
       (data_string, source_offset, len);
    source_offset=Add(source_offset, 8);
    dest_offset=Add(dest_offset, 128);
    }
  }
/* data is scattered into destination buffer */
```

In pseudo-code example 5, below, a NIC having table based forwarding capabilities is illustrated. Therein, an Evaluate operation specified in a received message is interpreted by the NIC to perform an indexed reference into a table. The indexed reference is first performed at message source to determine a target node name and then again at target node to determine the forwarding node name.

Pseudo-Code Example 5
```
Send(Evaluate(Target_Table[north_neighbor]), msg_len1,
  {
  data_string=Assign_string(data_len, data);
  Deliver_message(data_len, data_string);
  Send(Evaluate(Target_table[east_neighbor]), msg_len2,
  Deliver_message(data_len, data_string)
    )
  }
  )
/* north_neighbor and east_neighbor serve as logical name for nodes that are physically identified by a table ("Target_table[ ]"). This table is defined separately for each node*/
/* Each "Evaluation" occurs locally within a node context. */
/* Tables can be revised to change geometry */
```

Having now described exemplary techniques for embedding commands in data packets transmitted between NICs, as well as various exemplary NIC capabilities for interpreting and processing such embedded commands, it will be appreciated that the foregoing exemplary embodiments are subject to numerous variations in implementation. For example, the packets containing embedded commands can be generalized such that, instead of containing actual data, the header or the payload, or both, can contain references to data as long as the receiving NIC knows how to interpret that reference. For example, the header portion of a message packet can contain a reference to a third NIC instead of its identity. This functionality is illustrated in pseudo-code example 5 above. Likewise, data in the payload portion of a message according to an exemplary embodiment of the present invention can be a name (variable) or a pointer (an address in the sendee's memory). For example, consider again the example where a message's payload(s) contain a second message that the sendee NIC shall copy to a specified queue. Using the above generalization, a message's payload(s) can only contain an address, which the sendee NIC interprets to mean: (1) read the content at that address, (2) consider it as a message and (3) place it into a queue (specified separately).

Figure 7:
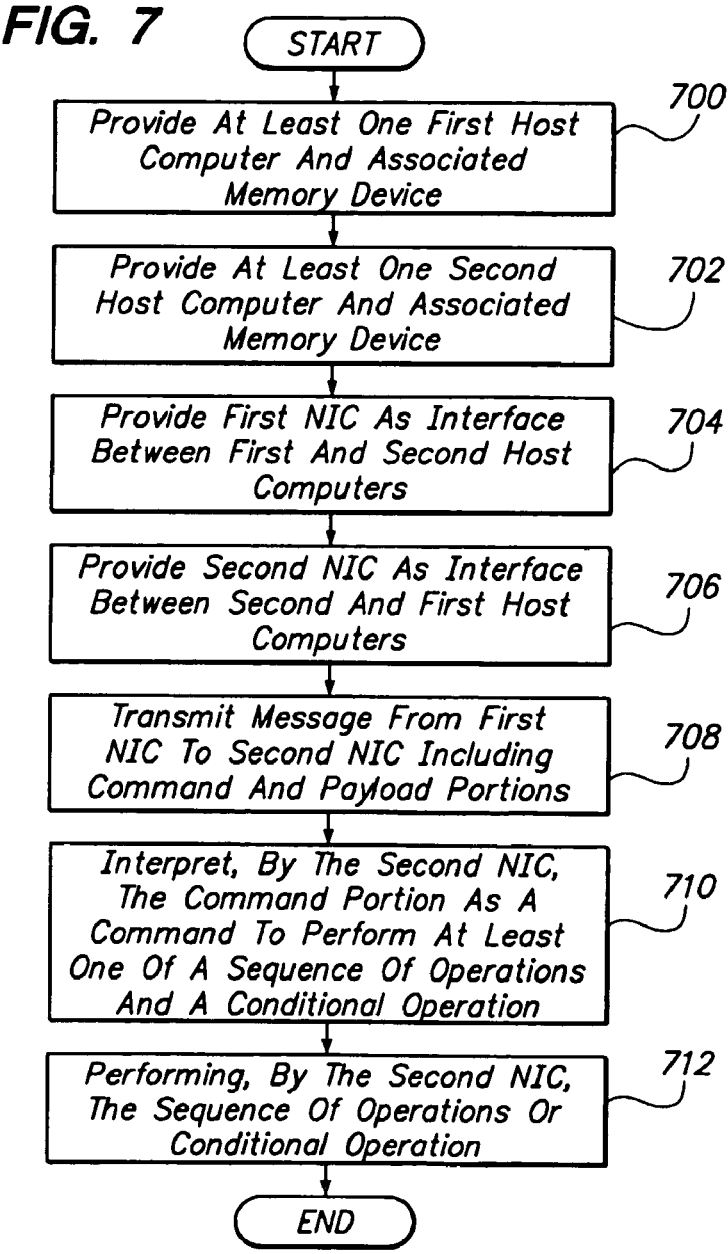
FIG. 7 is a flowchart depicting a method for communicating data between NICs according to an exemplary embodiment of the present invention.

A method for communicating commands between NICs in accordance with the foregoing can be generalized as illustrated in the flowchart of FIG. 7. Therein, a network is provided including at least one first host computer and at least one first memory device associated with the at least one first host computer (step 700) and at least one second host computer and at least one second memory device associated with the at least one second host computer (step 702). A first NIC is provided as an interface between the at least one first host computer and the at least one second host computer (step 704) and a second NIC is provided as an interface between the at least one second host computer and the at least one first host computer (step 706). The method further includes the step of transmitting a message from the first NIC to the second NIC, the message including a command portion and a payload portion (step 708). The second NIC interprets the command portion of the message as a command to perform at least one of: a sequence of operations or a conditional operation (step 710) and performs that sequence of operations or conditional operation (step 712).

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wired circuitry may be used in place of or in combination with software instructions to implement the present invention.

The foregoing description of exemplary embodiments of the present invention provides illustration and description, but it is not intended to be exhaustive or to limit the invention to the precise form disclosed. Modifications and variations are possible in light of the above teachings or may be acquired from practice of the invention. The following claims and their equivalents define the scope of the invention.

The invention claimed is:

1. A method comprising:
  receiving an original message sent by a first network interface controller (NIC) of a first host computer to a second NIC of a second host computer, the second NIC having a local processor separate from all other processors of the second host computer and having a local memory separate from all other memory of the second host computer,
    where the original message has a command portion and a payload portion, the command portion including a command that the first NIC is instructing the second NIC to perform, the payload portion including data in relation to which the command is to be performed by the second NIC;
  in response to receiving the original message by the second NIC from the first NIC,
    where the command of the command portion of the original message is a first command for the second NIC to copy the payload portion to the local memory of the second NIC,
      executing the command by the local processor of the second NIC, without intervention by any of the other processors of the second host computer from which the local processor of the second NIC is separate, such that execution of the command results in the payload portion being copied to the local memory of the second NIC that is separate from all the other memory of the second host computer,
      wherein latency in processing the original message is reduced at least because the local processor of the second NIC processes the command instead of one or more of the other processors of the second host computer from which the local processor of the second NIC is separate processing the command.

2. The method of claim 1, further comprising, in response to receiving the original message by the second NIC from the first NIC,
  where the command of the command portion of the original message is a second command for the second NIC to forward an embedded message within the payload portion of the original message to a third NIC and a fourth NIC, where a single copy of the embedded message is stored within the payload portion of the original message,
    making, by the local processor of the second NIC, a first copy of the embedded message;
    extracting, by the local processor of the second NIC, an identity of the third NIC from a descriptor of the third NIC within the payload portion of the original message;
    adding, by the local processor of the second NIC, the identity of the third NIC as has been extracted to the first copy of the embedded message;
    placing the first copy of the embedded message within an outbound queue for transmission from the second NIC to the third NIC;
    making, by the local processor of the second NIC, a second copy of the embedded message;
    extracting, by the local processor of the second NIC, an identity of the fourth NIC from a descriptor of the fourth NIC within the payload portion of the original message;
    adding, by the local processor of the second NIC, the identity of the fourth NIC as has been extracted to the second copy of the embedded message;
    placing the second copy of the embedded message within an output queue for transmission from the second NIC to the fourth NIC,
    wherein latency in forwarding the embedded message is reduced at least, first, because the first NIC sends the embedded message to the second NIC just once, as part of the payload portion of the original message, and second, because the local processor of the second NIC makes the first and the second copies of the embedded message, extracts the identities of the third and the fourth NICs, and places the first and the second copies within the output queue without intervention by any of the other processors of the second host computer from which the local processor of the second NIC is separate.

3. The method of claim 1, wherein the local memory of the second NIC comprises a command buffer of the second NIC.

4. The method of claim 1, wherein the local memory of the second NIC comprises a transmit queue of the second NIC.

5. The method of claim 1, further comprising sending by the second NIC to the first NIC that the original message was successfully received by the second NIC.

6. The method of claim 1, wherein the command of the command portion of the original message instructs the second NIC to iterate a sequence of operations over a number of iterations specified by the first NIC within the command of the command portion.

7. The method of claim 1, wherein the command of the command portion of the original message instructs the second NIC to iterate a sequence of operations over a number of iterations that the second NIC dynamically determines without being instructed by the first NIC within the command of the command portion.

8. A system comprising:
a first host computer;
a second host computer;
a first network interface controller (NIC) to operate as an interface for the first host computer to the second host computer;
a second NIC to operate as an interface for the second host computer to the first host computer, the second NIC to receive an original message from the first NIC, the original message having a command portion and a payload portion, the command portion including a command that the first NIC is instructing the second NIC to perform, the payload portion including data in relation to which the command is to be performed by the second NIC, the second NIC comprising:
a local processor separate from all other processors of the second host computer; and,
a local memory separate from all other memory of the second host computer,
wherein where the command of the command portion of the original message is a first command for the second NIC to copy the payload portion to the local memory of the second NIC,
the local processor of the second NIC is to execute the command, without intervention by any of the other processors of the second host computer from which the local processor of the second NIC is separate, such that execution of the command results in the payload portion being copied to the local memory of the second NIC that is separate from all the other memory of the second host computer,
wherein latency in processing the original message is reduced at least because the local processor of the second NIC is to process the command instead of one or more of the other processors of the second host computer from which the local processor of the second NIC is separate processing the command.

9. The system of claim 8, wherein where the command portion of the original message is a second command for the second NIC to forward an embedded message within the payload portion of the original message to a third NIC and a fourth NIC, where a single copy of the embedded message is stored within the payload portion of the original message,
the local processor of the second NIC is to make a first copy of the embedded message, is to extract an identity of the third NIC from a descriptor of the third NIC within the payload portion of the original message, is to add the identity of the third NIC to the first copy of the embedded message, and is to place the first copy of the embedded message within an outbound queue for transmission from the second NIC to the third NIC, and
the local processor of the second NIC is to make a second copy of the embedded message, is to extract an identity of the fourth NIC from a descriptor of the fourth NIC within the payload portion of the original message, is to add the identity of the fourth NIC to the second copy of the embedded message, and is to place the second copy of the embedded message within an outbound queue for transmission from the second NIC to the fourth NIC,
wherein latency in forwarding the embedded message is reduced at least, first, because the first NIC is to send the embedded message to the second NIC just once, as part of the payload portion of the original message, and second, because the local processor of the second NIC is to make the first and the second copies of the embedded message, is to extract the identities of the third and the fourth NICs, and is to place the first and the second copies within the output queue without intervention by any of the other processors of the second host computer from which the local processor of the second NIC is separate.

10. The system of claim 8, wherein the local memory of the second NIC comprises a command buffer of the second NIC.

11. The system of claim 8, wherein the local memory of the second NIC comprises a transmit queue of the second NIC.

12. The system of claim 8, wherein the second NIC is to send an acknowledgment to the first NIC that the original message was successfully received by the second NIC.

13. The system of claim 8, wherein the command of the command portion of the original message instructs the second NIC to iterate a sequence of operations specified within the payload portion of the original message, over a number of iterations specified by the first NIC.

14. The system of claim 8, wherein the command of the command portion of the original message instructs the second NIC to iterate a sequence of operations specified within the payload portion of the original message, over a number of iterations that the second NIC dynamically determines without being instructed by the first NIC within the command of the command portion.

15. A network interface controller (NIC) for a host computer, comprising:
a local processor separate from all other processors of the host computer; and,
a local memory separate from all other memory of the host computer,
wherein the NIC is to receive an original message from a different NIC, the original message having a command portion and a payload portion, the command portion including a command that the different NIC is instructing the NIC to perform, the payload portion including data in relation to which the command is to be performed by the NIC,
wherein where the command of the command portion of the original message is a first command for the NIC to copy the payload portion to the local memory of the NIC, the local processor of the NIC is to execute the command, without intervention by any of the other processors of the host computer from which the local processor of the NIC is separate, such that execution of the command results in the payload portion being copied to the local memory of the NIC that is separate from all the other memory of the host computer, wherein latency in processing the original message is reduced at least because the local processor of the NIC is to process the command instead of one or more of the other processors of the host computer from which the local processor of the NIC is separate processing the command.

16. The NIC of claim 15, wherein where the command portion of the original message is a second command for the NIC to forward an embedded message within the payload portion of the original message to a first additional NIC and a fourth NIC, where a single copy of the embedded message is stored within the payload portion of the original message, the local processor of the NIC is to make a first copy of the embedded message, is to extract an identity of the first additional NIC from a descriptor of the first additional NIC within the payload portion of the original message, is to add the identity of the first additional NIC to the first copy of the embedded message, and is to place the first copy of the embedded message within an outbound queue for transmission from the NIC to the third NIC, and the local processor of the NIC is to make a second copy of the embedded message, is to extract an identity of the fourth NIC from a descriptor of the fourth NIC within the payload portion of the original message, is to add the identity of the fourth NIC to the second copy of the embedded message, and is to place the second copy of the embedded message within an outbound queue for transmission from the NIC to the fourth NIC, wherein latency in forwarding the embedded message is reduced at least, first, because the different NIC is to send the embedded message to the NIC just once, as part of the payload portion of the original message, and second, because the local processor of the NIC is to make the first and the second copies of the embedded message, is to extract the identities of the third and the fourth NICs, and is to place the first and the second copies within the output queue without intervention by any of the other processors of the second host computer from which the local processor of the NIC is separate.

17. The NIC of claim 15, wherein the local memory of the NIC comprises a command buffer of the NIC.

18. The NIC of claim 15, wherein the local memory of the NIC comprises a transmit queue of the NIC.

19. The NIC of claim 15, wherein the NIC is to send an acknowledgment to the different NIC that the original message was successfully received by the NIC.

20. The NIC of claim 15, wherein the command of the command portion of the original message instructs the NIC to iterate a sequence of operations specified within the payload portion of the original message, over a number of iterations specified by the different NIC.

21. The NIC of claim 15, wherein the command of the command portion of the original message instructs the NIC to iterate a sequence of operations specified within the payload portion of the original message, over a number of iterations that the NIC dynamically determines without being instructed by the different NIC within the command of the command portion.

* * * * *